United States Patent [19]

Croft

[11] Patent Number: 4,995,669

[45] Date of Patent: Feb. 26, 1991

[54] ADJUSTABLE LATCHING DEVICE WITH MEMORY FEATURE FOR VEHICLE SEAT ASSEMBLIES

[75] Inventor: George Croft, Oakville, Canada

[73] Assignee: Canadian A.S.E. Limited, Mississauga, Canada

[21] Appl. No.: 453,653

[22] Filed: Dec. 20, 1989

[30] Foreign Application Priority Data

Dec. 28, 1988 [CA] Canada ............................. 587172

[51] Int. Cl.⁵ ............................................. B60N 2/02
[52] U.S. Cl. .................................. 297/379; 277/367; 277/369
[58] Field of Search ............... 297/379, 367, 368, 369

[56] References Cited

U.S. PATENT DOCUMENTS

| | | | |
|---|---|---|---|
| 3,953,069 | 4/1976 | Tamura et al. | 297/367 |
| 3,958,828 | 5/1976 | Ishida et al. | 297/367 |
| 4,085,969 | 4/1978 | Nakane et al. | 297/367 |
| 4,466,661 | 8/1984 | Narita | 297/366 |
| 4,502,730 | 3/1985 | Kazaoka et al. | 297/379 |
| 4,660,886 | 4/1987 | Terada et al. | 297/367 |

Primary Examiner—Kenneth J. Dorner
Assistant Examiner—James M. Gardner
Attorney, Agent, or Firm—Patrick J. Hofbauer

[57] ABSTRACT

This invention provides an improved adjustable latching device for use with a vehicle seat assembly having a first and a second seat member pivotally foldable relative to one another about a pivot axis between folded and unfolded operative configurations. The device accommodates both the well-known "dumping" and "reclining" features and is comprised of a latch pin rigidly mounted on the first seat member so as to define a first concentric arc of movement upon said pivotal folding of the first seat member about the pivot axis and an idler plate having a generally arcuate gear sector and being mounted for rotation about the pivot axis. A locking arm is rotatably mounted on the idler plate and presents a detent portion position adjacent one end in spaced relation from the point of rotational movement of the arm so as to be adapted to lockingly engage the latch pin, which locking engagement in turn causes rotation of the idler plate with the first seat member in at least one rotational direction upon pivotal folding of the first seat member. A first rotational control means for selectively rotating the locking arm into and out of the aforementioned locking engagement is also provided. A pawl means having a head and a tail portion is pivotally mounted on the second seat member intermediate its head and tail portions for pivotal movement between a first rotational position at which the head portion lockingly engages the gear sector to prevent rotation of the idler plate and the second rotational position at which the head portion is disengaged from the gear sector to allow for rotation of the idler plate about the pivot axis. A second rotational control means for selectively rotating the pawl means between the aforementioned first and second rotational positions is also provided. The device disclosed is considerably simpler to manufacture and assemble than previously known devices having the same features.

11 Claims, 6 Drawing Sheets

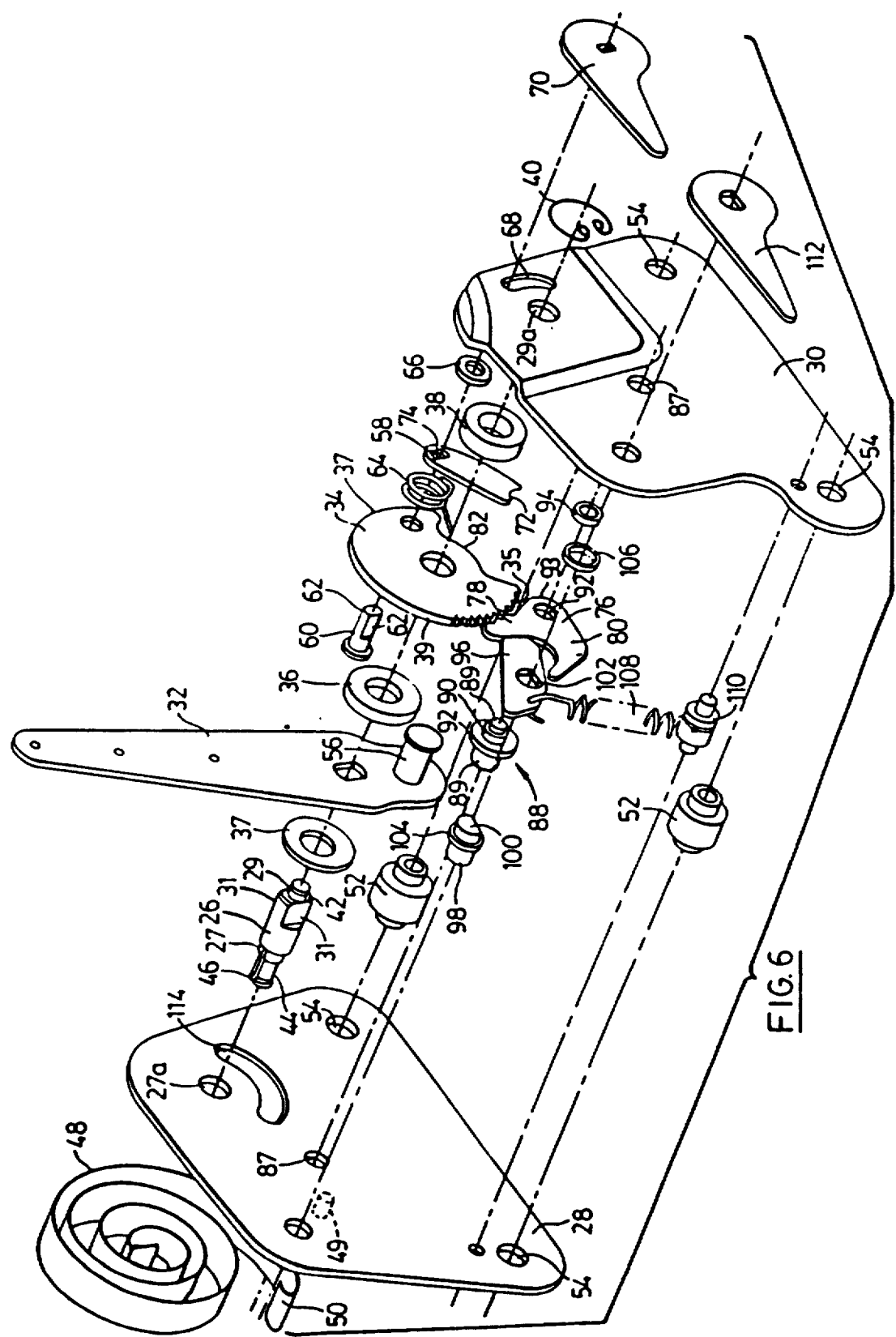

ADJUSTABLE LATCHING DEVICE WITH MEMORY FEATURE FOR VEHICLE SEAT ASSEMBLIES

This invention relates to a latching device for use with foldable vehicle seat assemblies, and more particularly, to latching devices for such assemblies which are adapted to allow for both dumping of the backrest member of the seat assembly as defined below and for reclining of the backrest member relative to the seat assembly in order to facilitate the individual posture preferences of various seat occupants.

Vehicle seat assemblies having a backrest member foldable over a seat cushion member are prevalent in the automotive industry. In two-door vehicle applications, it is common for the backrest member to be forwardly foldable over the seat cushion member to allow for ingress and egress of passengers into a rear passenger carrying compartment. In two-seater vehicles such forward folding of the backrest member allows for access to a storage compartment located behind the vehicle seat. In four-door vehicles, it is well-known to provide for rearward folding of the backrest member from the normal upright operative configuration to allow for either cargo carrying or repose of a seat occupant.

The "dumping" feature typically allows for the user to release the latching mechanism and fold the backrest member in a single movement to a full forwardly folded configuration or to a full rearwardly folded configuration. The backrest member is typically spring biased toward an upright operative configuration.

The "reclining" feature allows the user, through the manipulation of a lever or handle, to adjust the inclination angle of the backrest member relative to the seat-cushion member either forwardly or rearwardly from the so-called upright "design" position in typical increments of approximately 2-3 degrees of arc so as to select a seat configuration comfortable to the user.

It has been common in the design of latching mechanisms for vehicle seat assemblies to provide separate mechanisms for control of the dumping and reclining features. This is typically necessary in order to avoid undue complexity in the design and assembly of the latching devices. Moreover, if the dumping and reclining features are combined in a single latching device, it is typically the case that use of the dumping feature will result in the loss of a particular reclining position previously set by a seat occupant. That is, if the backrest member is forwardly or rearwardly dumped, it will be necessary for the seat occupant, after reverse-dumping to a generally upright orientation of the backrest member, to again finely adjust the inclination angle of the backrest member to its previously selected position by using the reclining feature of the latching device. This can be particularly frustrating in two-door vehicle applications where ingress or egress of rear-seat passengers will necessitate re-adjustment of the inclination angle of the backrest member after each entry or exit from the rear passenger compartment of the vehicle.

It is, therefore, desirable to incorporate a "memory" feature into combined dumping and reclining latching mechanisms, so that the previously set inclination angle of the backrest member will be retained following a forward or rearward dumping of the backrest member. While various "memory" devices of this general type are known in the prior art, they have not seen widespread acceptance in the auto industry because they are complex, expensive to manufacture and difficult to operate and assemble. Thus, prior art memory devices for this purpose have, for the mostpart, been unacceptable to original equipment vehicle manufacturers.

It is thus an object of the present invention to provide an improved latching device for foldable vehicle seat assemblies of the general type having dumping and reclining features combined with a memory feature, which device is compact, safe, simple to operate and inexpensive to manufacture, and which may be esthetically incorporated into a vehicle seat assembly such that interference and hazardous exposure of any of the latching elements are minimized.

In accordance with one aspect of the invention, there is provided an adjustable latching device for use with a vehicle seat assembly having a first and a second seat member pivotally foldable relative to one another about a pivot axis between folded and unfolded operative configurations, the device comprising a latch pin rigidly mounted on the first seat member so as to define a first concentric arc of movement upon pivotal folding of the first seat member about the pivot axis. An idler plate, having a general arcuate gear sector, is mounted for rotation about the pivot axis. A locking arm is rotatably mounted on the idler plate and has a detent portion positioned adjacent one of its ends in spaced relation from the point of rotational movement of the arm, so that the locking arm is adapted to restrainingly engage the latch pin by the detent portion thereby to cause rotation of the idler plate with the first seat member in at least one rotational direction upon pivotal folding of the first seat member about the pivot axis in said at least one rotational direction. A first rotational control means is provided for selectively rotating the locking arm into and out of the aforementioned restraining engagement. A pawl means, having a head and a tail portion, is pivotally mounted on the second seat member intermediate the head and tail portions, for movement between a first rotational position at which the head portion lockingly engages the gear sector so as to prevent rotation of the idler plate, and a second rotational position at which the head portion is disengaged from the gear sector to allow for rotation of the idler plate about the pivot axis. Moreover, a second rotational control means is provided for selectively rotating the pawl means between the first and second rotational positions. A spring means is preferentially included in the first rotational control means, and is arranged to bias the locking arm toward locking engagement with the latch pin. Moreover, the second rotational control means of the device preferentially includes a spring means adapted to rotationally bias the pawl means towards the second rotational position thereof. It is also desirable that the second circumferential portion of the idler plate be spaced from the first circumferential portion and that such second circumferential portion be radially indented to form an arcuate channel coincident with the first concentric arc of movement, into which channel the latch pin actually extends. The two circumferential ends of this arcuate channel thereby define a respective first and second interference means adapted to restrainingly contact the latch pin so as to limit its arcuate movement upon pivotal folding of the first seat member when the locking arm is disengaged from the latch pin and the pawl means is in its said first rotational position, thereby to define respective folded and unfolded rotational limit positions of the first seat member.

These and other objects and features of the invention will be more fully understood with reference to a preferred embodiment of latching device according to the invention, described by way of example only, with reference to the accompanying drawings, in which:

FIG. 6 is an exploded perspective view of the device of FIGS. 2-5.

Figure 1:
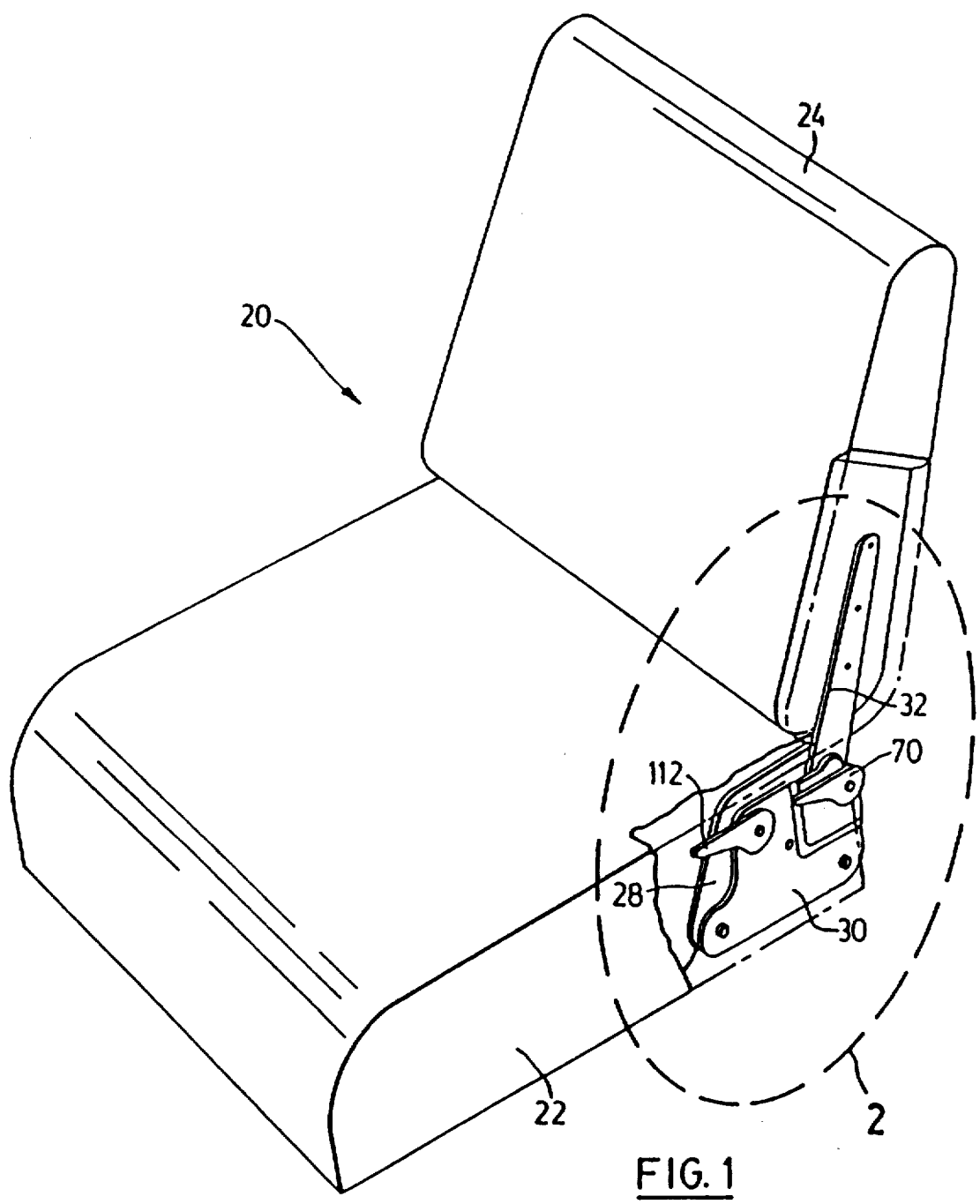
FIG. 1 is a schematic isometric projection, partly cut-away, of a foldable vehicle seat assembly to which the invention of application has been adapted.

Referring to FIG. 1, a foldable vehicle seat assembly, generally indicated by the reference numeral 20, includes a seat-cushion member 22 and a backrest member 24. The seat assembly 20 is illustrated in FIG. 1 with the backrest member 24 in an unfolded, generally upright, operative passenger carrying configuration with the backrest member 24 upright relative to seat-cushion member 22. Seat-cushion member 22 is anchored to the vehicle floor (not shown) in any conventional manner and may house, for example, a leg room adjustment mechanism (not shown).

Figure 3:
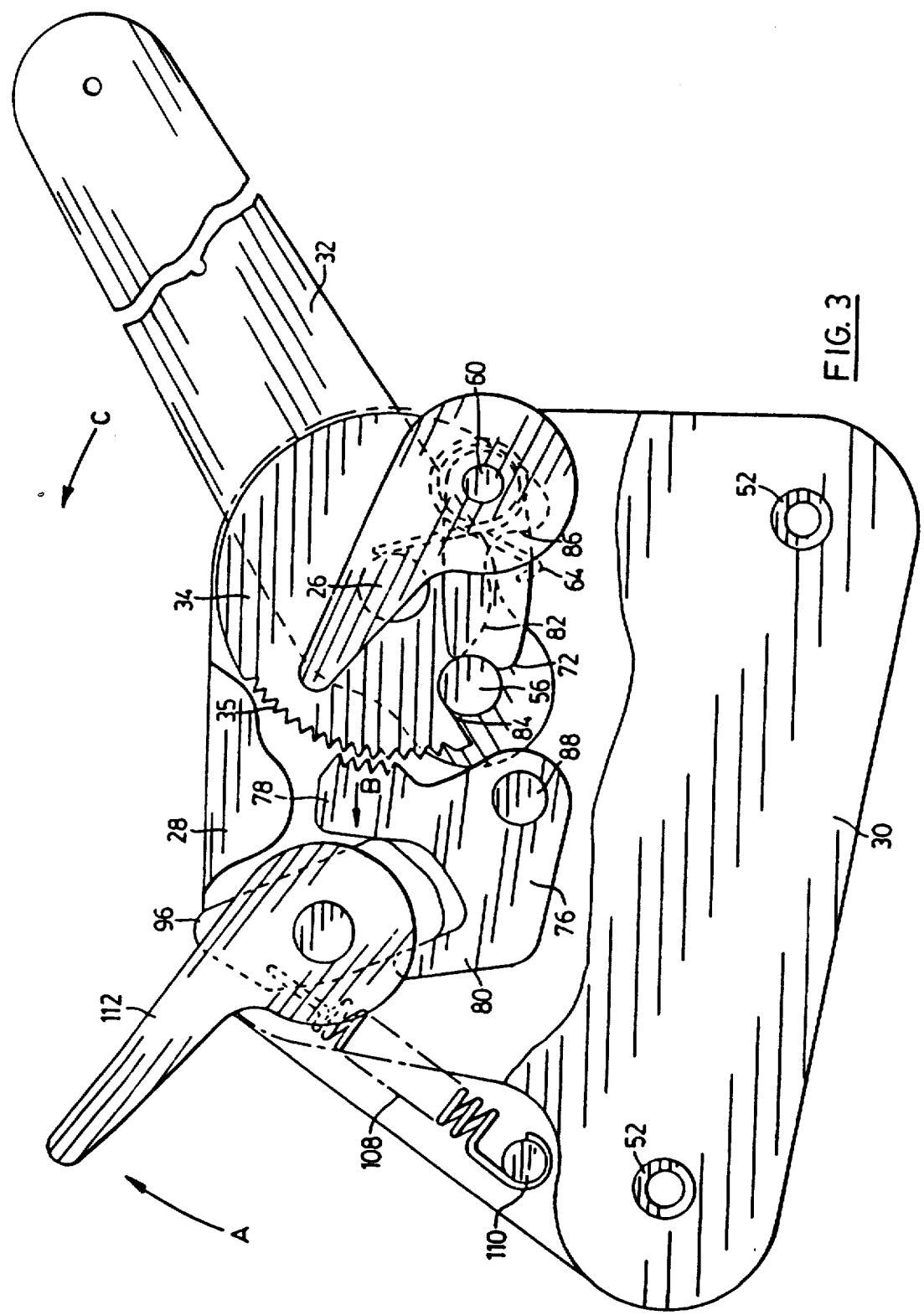
FIG. 3 is a view similar to FIG. 2, illustrating the latching mechanism unlocked to allow reclining adjustment of the inclination angle of the backrest member.
Figure 4:
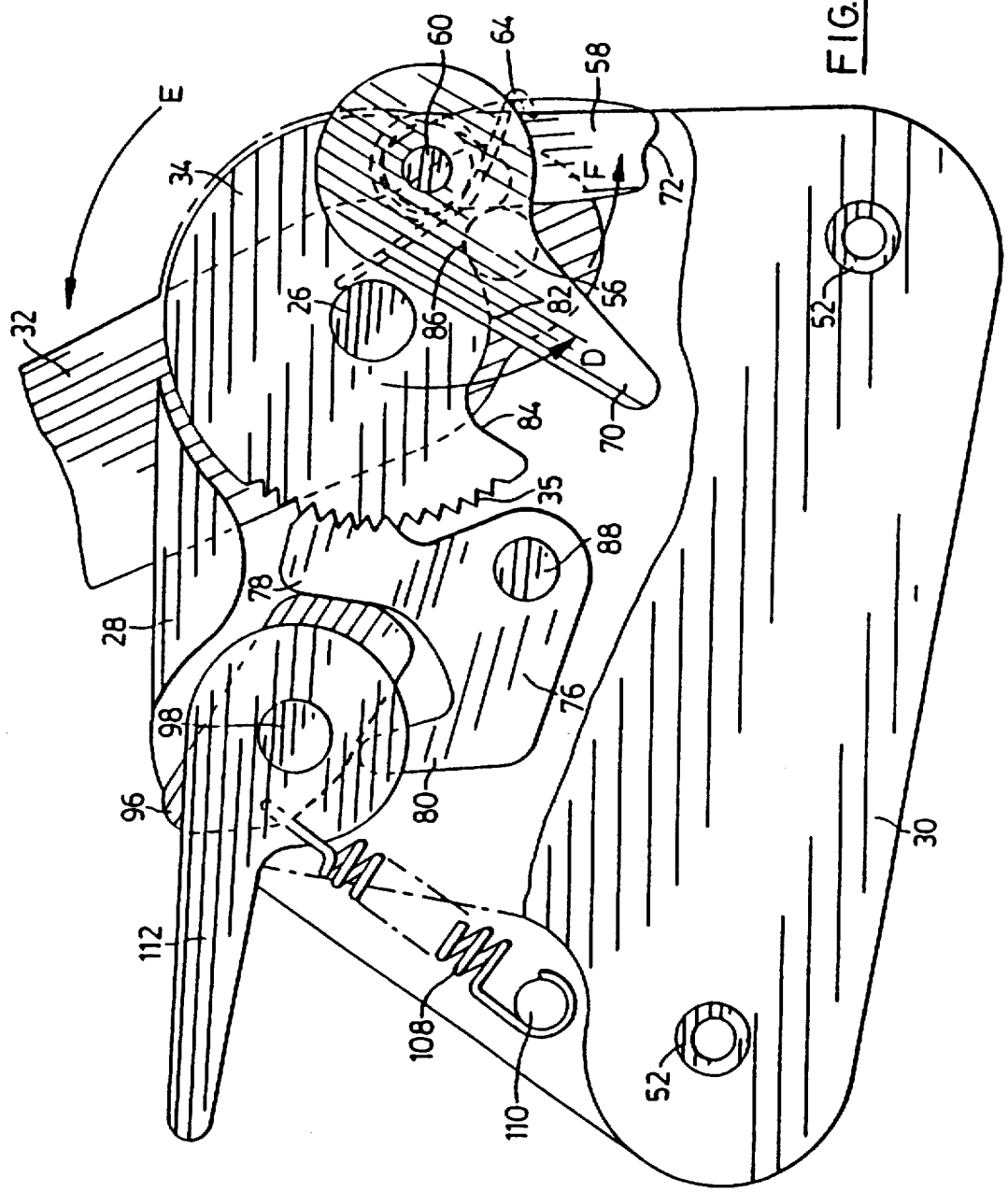
FIG. 4 is a view similar to FIG. 3, illustrating the latching device unlocked to allow forward dumping of the backrest member.

The backrest member 24 is pivotally forwardly foldable about a pivot axis, defined by pivot pin 26, relative to the seat-cushion member 22 into a forwardly folded position, as shown in FIG. 4, so as to facilitate access behind the vehicle seat assembly 20 and is rearwardly foldable about the same pivot axis relative to the seat-cushion member 22 into a rearwardly folded position, as shown in FIG. 3.

A latching device according to the invention is shown in FIG. 1, encircled by dotted line 2. While the subject latching device is only illustrated on one side of the seat assembly 20, it will be understood that the vehicle seat assembly 20 may have a generally similar counterpart latch assembly attached to the opposite side of the seat assembly 20, which counterpart may be connected for simultaneous operation with the latch assembly shown by way of, for example, a driven slave connecting rod (not shown). It should be appreciated that the various common structural frame members of seat-cushion member 22 and the backrest member 24 have been omitted for simplicity from the drawings. The form and placement of these is well-known in the art as is the means of their affixation to the illustrated latching device. Where, in this specification, it is stated that a member is affixed or mounted on the seat-cushion member 22 or the backrest member 24, this expressly includes affixation or mounted on or to a respective frame member of the said seat-cushion 22 or backrest member 24.

Referring now to FIGS. 2-6, it will be seen that the pivot pin 26, which is formed of hardened steel, has a first reduced diameter portion 27 and a second reduced diameter portion 29. The first reduced diameter portion 27 is mounted for rotation in a correspondingly diametered aperture 27a formed in a lower hinge bracket 28.

A second reduced diameter end portion 29 is mounted for rotation in a correspondingly diametered aperture 29a of the cover plate 30. An upper hinge bracket 32 is mounted for rotation with the pivot pin 26 by means of opposed flats 31, 31 on the pivot pin 26. Similarly, an idler plate 34, having a generally arcuate gear sector 35 is positioned on a second circumferential edge portion 39 of the idler plate 34 and is mounted for free rotation about the pivot pin 26, being spaced from the upper hinge bracket 32 by means of an operatively dimensioned metal or fiber spacer 36.

A latch pin 56 of hardened steel is rigidly mounted on the upper hinge bracket 32 so as to define a first concentric arc of movement upon pivotal forward or rearward folding of the backrest member 24 about the pivot axis defined by the pivot pin 26. The purpose and operation of this latch pin is described more fully below.

Figure 2:
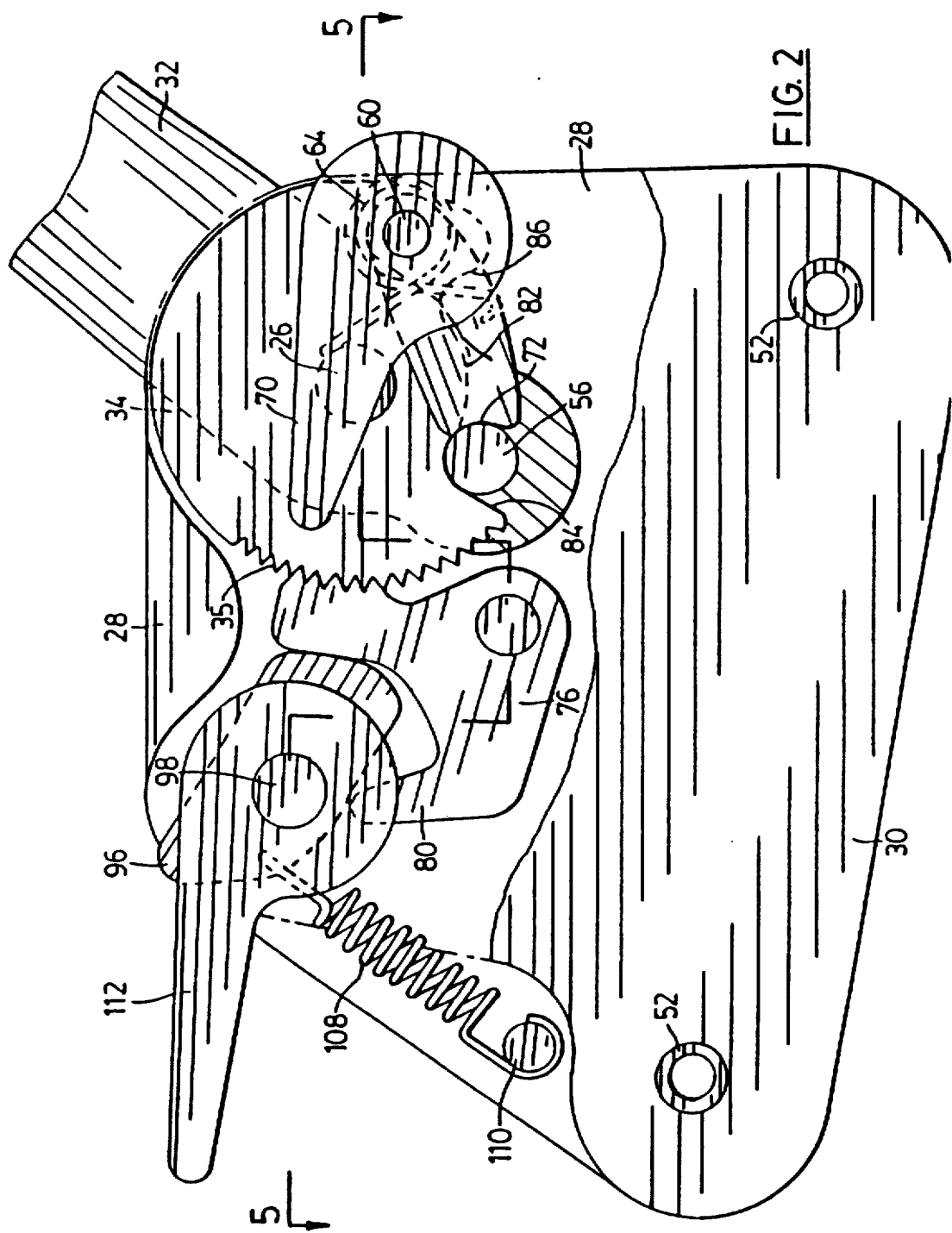
FIG. 2 is a side elevational view, partly cut-away, of a latching device according to the invention shown in a fully locked configuration, with the backrest member in a generally upright operative configuration.

The idler plate 34 also presents a third circumferential edge portion, which third edge portion is radially indented to form an arcuate channel 82 coincident with the first concentric arc of movement defined by the latch pin 56 upon pivotal folding of the backrest member 24. As best seen in FIGS. 2-4, the latch pin 56 extends transversely into the arcuate channel 82. The two circumferential ends of the channel 82 define a first 84 and a second 86 interference means adapted to restrainingly contact the latch pin 56 so as to limit its arcuate travel along said first concentric arc of movement upon pivotal folding of the backrest member 24, thereby to define respective folded and unfolded rotational limit positions of the backrest member 24, as seen in FIGS. 2 and 4, respectively and as more fully described below.

A second spacer 37 is dimensioned to maintain critical spacing between the upper hinge bracket 32 and the lower hinge bracket 28. A third metal or fiber spacer 38 maintains the critical design spacing between the idler plate 34 and cover plate 30. A C-retainer clip 40 restrainingly engages a circumferential slot 42 (visible only as a line in FIG. 6) on the reduced diameter end portion 29 of the pivot pin 26.

Figure 5:
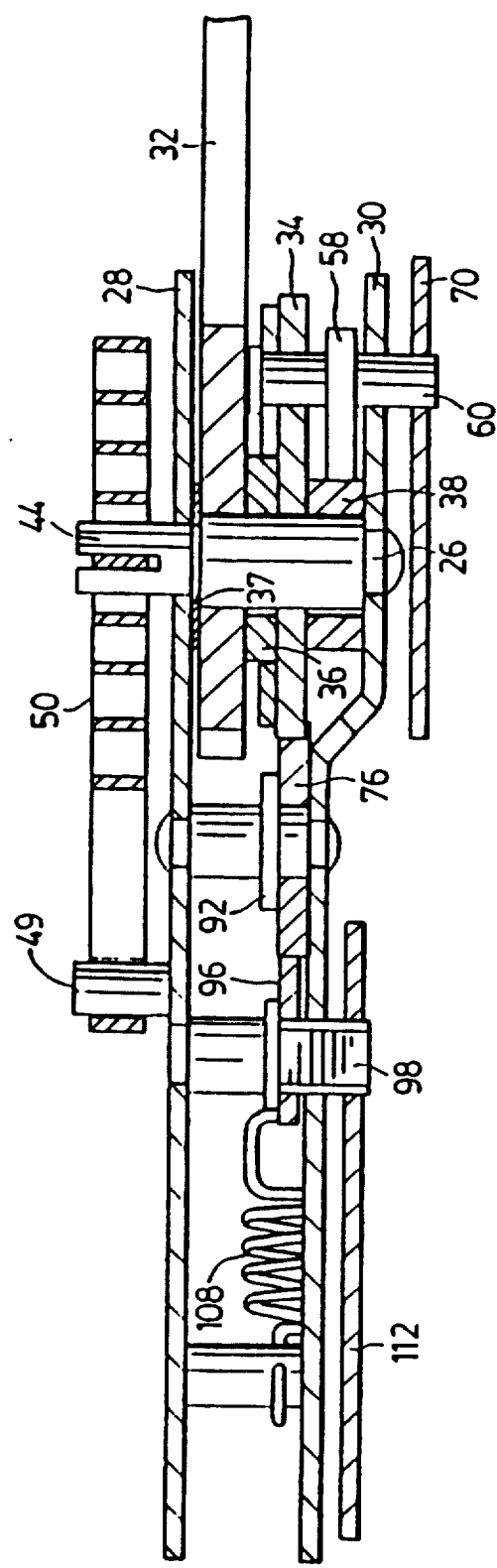
FIG. 5 is a sectional view along broken line 5—5 of FIG. 2.

The opposite other end of the pivot pin 26 features an extended portion 44 of yet further reduced diameter which portion 44 features an axially extending slot 46 which extends to the free end of the further reduced portion 44 and is dimensioned and otherwise adapted to receive the inner end of a clock-type spring 48 (which has been removed for ease of illustration from FIG. 5). The outer end 50 of the clock-like spring engages a stud 49 on the lower hinge bracket 28 such that, upon forward folding of the backrest member 14 from a normal upright configuration as generally shown in FIG. 1, the clock-type spring 48 is tightened so as to progressively resist such folding and thereby bias the backrest member 24 back toward said normal upright configuration.

The critical operative distance between the lower hinge bracket 28 and the cover plate 30 is determined by the dimensioning of the pivot pin 26 and its related spacers 37, 36 and 38 as described above, and, by means of lower spacer 52, 52, the reduced diameter end portions of which bushings 52, 52 are retained within aligned apertures 54 of the lower hinge bracket 28 and cover plate 30, respectively. The lower spacer bushings 52 have a hollow central bore designed to receive bolts or other affixation means (not shown) so as to rigidly affix the lower hinge bracket/cover plate assembly to the seat-cushion member 22.

A locking arm 58 is rotatably mounted adjacent a first circumferential edge portion 37 of the idler plate 34, by means of flat-sided aperture 74 about a second pivot pin 60, and is keyed for rotation therewith by means of opposed flats 62, 62 positioned on the second pivot pin 60. A tortion spring 64 surrounds the second pin 60 and engages a lower edge of the locking arm 58 and a surface of pivot pin 26 so as to bias the locking arm 58 toward engaging relation with the latch pin 56, as best seen in FIG. 3. A spacing washer 66 defines the operative distance between the locking arm 58 and the inner face of the cover plate 30, and the free end of the second pivot pin 60 protrudes through a generally arcuate slot 68 in the cover plate 30, beyond which cover plate 30 the flats 62, 62 engage a first rotational control means in the form of a lever handle 70, which lever handle 70 is rigidly affixed to the second pivot pin 60 by any conventional fastening means (not shown).

It will be seen from the Figures that the locking arm 58 has a detent portion 72 positioned adjacent one of its ends in spaced relation from the point of rotational pivoting of the arm, such point being centrally positioned within the flat-sided aperture 74. In this manner and through appropriate dimensioning of the locking arm 58, the locking arm is adapted to restrainingly engage the latch pin 56 thereby to cause rotation of the idler plate 34 on pivotal folding of the backrest member 24 in at least one rotational direction. FIGS. 2 and 3 show the locking arm 58 in such restraining engagement with the latch pin 56, it being appreciated that the idler plate 34 will rotate with the upper hinge bracket 32 upon pivotal forward folding of the backrest member 24, as the latch pin 56 is restrainingly engaged by the detent portion 72 of the spring biased locking arm 58, so as to effectively form a unitary structure therewith upon said forward folding. It will, of course, also be appreciated from FIGS. 2 and 3 that the locking arm 58 is dimensioned to restrainingly engage the latch pin 56 when the first interference means 84 is also in contact with the latch pin 56, so that the latch pin is held therebetween, thus causing the idler plate 34 to also rotate with the upper hinge bracket 32 upon pivotal rearward folding of the backrest member 24, at least where the idler plate 34 is otherwise free to rotate.

A pawl means 76 having a head portion 78 and a tail portion 80 is pivotally mounted on the lower hinge bracket 28 by means of a pivot pin 88 having reduced diameter end portions 89, 89 mounted in aligned apertures 87 positioned in each of the lower hinge bracket 28 and the cover plate 30. The pawl means 76 is mounted on an intermediate diameter portion 90 of the pivot pin 76 by means of a correspondingly dimensioned aperture 92 formed in an intermediate portion 93 of the pawl means 76. The pawl means 76 is held in the appropriate axial position on the pivot pin 88 by means of an enlarged annular ridge portion 92 of the pivot pin 88 and by means of a fibre or metal spacer element 94. In this manner, the pawl means 76 is mounted for pivotal movement between a first rotational position (shown in FIGS. 2 and 4), whereat the head portion 78 lockingly engages the gear sector 35 of the idler plate 34 to prevent rotation of the idler plate 34 (and any structures attached thereto), and a second rotational position (see FIG. 3) whereat the head portion 78 is disengaged from said gear sector 35 to allow for rotation of the idler plate 34 (and any structures attached thereto) about the pivot axis defined by the pivot pin 88.

A second rotational control means is also provided to selectively rotate the pawl means 76 between its first and second rotational positions as defined above. Such rotational control means comprises a cam member 96 mounted on the lower hinge bracket 28 by means of a drive pin 98 having a one-sided flat 100 which is drivingly keyed to a flat-sided aperture 102 in the cam member 96. A spacer ridge 104 and a metal or fibre spacer element 106 maintain operative positioning of the cam member 96 in relation to the lower hinge bracket 28 and the cover plate 30. In this manner, the cam member is mounted on the seat member for pivotal movement between a first cam pivotal position whereat the cam means contacts the head portion 78 of the pawl means 76 thereby to urge said head portion 78 into the aforementioned locking engagement with the gear sector 35, as best seen in FIG. 2, and a second cam pivotal position whereat the cam means 96 bears upon the tail portion 80 of the pawl means 76 so as to urge the pawl means into its second rotational position, that is, into disengagement from the gear sector 35 (as seen in FIG. 3), thereby to allow rotation of the idler plate 34.

The second rotational control means further comprises a coil spring means 108 interconnected between the cam member 96 and a spacer stud 110 so as to rotationally bias the cam member 96 towards its first operative position and, in turn, bias the pawl means 76 into locking engagement with the gear sector 35. A control handle 112 is keyed to the flat 100 on the drive pin 98 so as to allow the user to selectively rotate the cam means 96 between its first and second operative positions, as required.

In operation, a seat occupant adjusts the inclination angle of the backrest member 24 relative to the seat-cushion member from the "design" position of FIG. 1 to a preferential seating position by grasping the control handle 112 and rotating it in the direction of arrow A of FIG. 3 so as to cause the cam member 96 to impinge upon the tail portion 80 of the pawl means 76 so as to cause the head portion 78 of the pawl means 76 to move from its first rotational position (as seen in FIG. 2) in the direction of arrow B of FIG. 3 towards its second rotational position (shown in FIG. 3) at which second position the head portion 78 is disengaged from the gear sector 35, thereby allowing the clock spring 48 to bias the upper hinge bracket 32 (and the attached backrest member 24) in the forwardly folded direction of arrow C. It will be appreciated that the degree of reclining inclination adjustment is limited by the radial extent of the gear sector 35 and that if the occupant wishes to adjust the backrest member 24 rearwardly (i.e. opposite to the direction of arrow C), then they must manually grasp the backrest member 24 and effect such adjustment against the biasing of clock spring 48.

It will also be appreciated that a limit pin (not shown) is positioned on the far side of the upper hinge bracket 32 in aligned relation with an arcuate slot 114 formed in the lower hinge bracket 28 to limit the pivotal travel of the upper hinge bracket 32, regardless of the adjustment mode of the latching device.

Once the particular inclination adjustment position has been achieved by the seat occupant in the manner described above, the control handle 112 is released by the occupant and, under the spring biasing of coil spring 108 through the agency of the cam means 96, returns to its first rotational position thereby to again engage the gear sector 35 and hold fast the upper hinge bracket 32 in the readjusted position in a manner analogous to FIG. 2.

When the user is desirous of forwardingly dumping the backrest member 24, so as, for example, to allow ingress or egress to the rear passenger compartment of the vehicle, he grasps the lever handle 70 and rotates it in the direction of arrow D of FIG. 4 so as to rotate the locking arm 58 in the direction of arrow F as will be seen in FIG. 4, this rotation of the locking arm 58 causes the detent portion 72 of the locking arm to be disengaged from the latch pin 56 thereby allowing rotation of the upper hinge bracket 32 in the direction of arrow E of FIG. 4, independently of the idler plate 34, which idler plate remains lockingly engaged by the head portion 78 of the pawl means 76.

With the locking arm 58 removed to the position shown in FIG. 4, the latch pin 56 is free to travel within the arcuate channel 82, at least within the confines of the first 84 and second 86 interference means.

When it is desired to return the backrest member 24 from the forwardly dumped configuration to its previously selected upright inclination position, the user simply releases the lever handle 70 and pushes the backrest member 24 (against the spring biasing of the clock spring 48) rearwardly, whereupon the latch pin 56 rides upon the top edge of the locking arm 58 (which is biased by the tortion spring 64 toward the position of FIG. 2) until the latch pin 56 contacts the first interference means 84, whereupon the detent portion 72 of the locking arm 58 is able, under the said spring biasing, to once again lockingly engage the latch pin thereby to restrain further movement of the upper hinge bracket 32 and the attached backrest member 24. It will be appreciated that such restraining engagement of the latch pin occurs at the previously set backrest inclination adjustment position. Thus, the mechanism allows the backrest member 24 to be "dumped" without loss of the previously set inclination adjustment position.

It will be understood that numerous variations as will occur to those skilled in the art may be made to the above-described embodiment of the invention without departing from the claimed scope of the invention. Such variations will include providing latch pin on the seat-cushion member and the locking arm 58 and idler plate 34 on the backrest member. It will also be understood that the first rotational and second rotational control means for rotating the locking arm and the pawl means, respectively, may vary considerably; a latching device may be provided on both sides of the seat assembly; and seat assembly may be removable from the vehicle floor. Such modifications or changes are mere design choices which will be immediately obvious to those skilled in the art.

I claim:

1. An adjustable latching device for use with a vehicle seat assembly having a first and a second seat member pivotally foldable relative to one another about a pivot axis between folded and unfolded operative configurations, the device comprising:
    a latch pin rigidly mounted on the first seat member so as to define a first concentric arc of movement upon said pivotal folding of the first seat member about said pivot axis;
    an idler plate having a generally arcuate gear sector and being mounted for rotation about said pivot axis;
    a locking arm rotatably mounted on the idler plate and having a detent portion positioned adjacent one end in spaced relation from the point of rotational movement of the arm so as to be adapted to restrainingly engage the latch pin thereby to cause rotation of the idler plate with the first seat member in at least one rotational direction upon pivotal folding of the first seat member about said pivot axis in said at least one rotational direction;
    a first rotational control means for selectively rotating the locking arm into and out of said restraining engagement;
    a pawl means, having a head and a tail portion, and being pivotally mounted on the second seat member intermediate said head and tail portions for pivotal movement between a first rotational position whereat said head portion lockingly engages said gear sector to prevent rotation of the idler plate and a second rotational position whereat said head portion is disengaged from said gear sector to allow for said rotation of the idler plate about said pivot axis; and,
    a second rotational control means for selectively rotating the pawl means between said first and said second rotational positions.

2. The device according to claim 1, wherein the first member of the vehicle seat assembly is a backrest member and wherein the second seat member of the vehicle seat assembly is a seat-cushion member.

3. The device according to claim 2, wherein the first rotational control means includes a spring means for rotationally biasing the locking arm toward said restraining engagement with the latch pin.

4. The device according to claim 3, wherein the idler plate is of generally circular outline and wherein the locking arm is rotatably mounted adjacent a first circumferential edge portion of said idler plate.

5. The device according to claim 4, wherein the gear sector is positioned on a second circumferential edge portion of the idler plate so as to define, upon said rotation of the idler plate, a second concentric arc of rotation.

6. The device according to claim 5, wherein a third circumferential edge portion of the idler plate, spaced from said first circumferential edge portion, is radially indented to form an arcuate channel coincident with said first concentric arc of movement, into which channel the latch pin axially extends, the two circumferential ends of said channel defining respective first and second interference means adapted to restrainingly contact the latch pin so as to limit arcuate travel of said pin through said first concentric arc of movement upon pivotal folding of the first seat member when the locking arm is disengaged from the latch pin and the pawl means is in its said first rotational position, thereby to define respective folded and unfolded rotational limit positions of the first seat member.

7. The device according to claim 6, wherein the second rotational control means comprises a cam means mounted on the seat member for pivotal movement between a first and a second cam pivotal position such that, in the first cam pivotal position, the cam means urges the head portion of the pawl means into said first rotational position, and, wherein, in the second cam pivotal position, the cam means urges the pawl means into the said second rotational position.

8. The device according to claim 7, wherein the second rotational control means includes a spring means adapted to rotationally bias the cam member towards the first cam pivotal position thereof.

9. The device according to claim 8, wherein said second rotational control means comprises a lever member drivingly connected to said cam means to effect said rotational movement of the cam means.

10. The device according to claim 9, wherein the latch pin is mounted on the backrest member by means of a hinge bracket supporting a pivot pin about which the seat members are pivotally foldable relative to one another, which pivot pin defines said pivot axis.

11. In a vehicle having a seat assembly including a first, and a second seat member pivotally foldable relative to one another about a pivot axis between folded and unfolded operative positions and an adjustable latching device for releaseably holding said seat members in said positions, the latching device comprising:

a latch pin rigidly mounted on the first seat member so as to define a first concentric arc of movement upon said pivotal folding of the first seat member about said pivot axis;

an idler plate having a generally arcuate gear sector and being mounted for rotation about said pivot axis;

a locking arm rotatably mounted on the idler plate and having a detent portion positioned adjacent one end in spaced relation from the point of rotational movement of the arm so as to be adapted to restrainingly engage the latch pin thereby to cause rotation of the idler plate with the first seat member in at least one rotational direction upon pivotal folding of the first seat member about said pivot axis;

a first rotational control means for selectively rotating the locking arm into and out of said locking engagement;

a pawl means, having a head and a tail portion, and being pivotally mounted on the second seat member intermediate said head and tail portions for movement between a first rotational position whereat said head portion lockingly engages said gear sector to prevent rotation of the idler plate and a second rotational position whereat said head portion is disengaged from said gear sector to allow for said rotation of the idler plate about said pivot axis; and, a second rotational control means for selectively rotating the pawl means between said first and said second rotational positions.

* * * * *